United States Patent
Armangau et al.

(10) Patent No.: US 10,983,862 B2
(45) Date of Patent: Apr. 20, 2021

(54) PRIORITIZED REBUILDING OF EXTENTS IN MULTIPLE TIERS

(71) Applicant: EMC IP Holding Company LLC, Hopkinton, MA (US)

(72) Inventors: Philippe Armangau, Acton, MA (US); Vamsi K. Vankamamidi, Hopkinton, MA (US); Pavan Vutukuri, Chelmsford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 87 days.

(21) Appl. No.: 16/398,856

(22) Filed: Apr. 30, 2019

(65) Prior Publication Data
US 2020/0349007 A1    Nov. 5, 2020

(51) Int. Cl.
*G06F 11/07* (2006.01)
*G06F 11/10* (2006.01)
*G06F 3/06* (2006.01)

(52) U.S. Cl.
CPC ........ *G06F 11/1092* (2013.01); *G06F 3/0619* (2013.01); *G06F 3/0632* (2013.01); *G06F 3/0644* (2013.01); *G06F 3/0685* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 8,689,040 B2 * | 4/2014 | Kidney | G06F 11/1088 714/6.1 |
| 9,690,660 B1 | 6/2017 | Robins et al. | |
| 9,804,939 B1 | 10/2017 | Bono et al. | |
| 9,921,912 B1 | 3/2018 | Vankamamidi et al. | |
| 10,013,323 B1 | 7/2018 | Puhov et al. | |
| 10,210,045 B1 | 2/2019 | Gao et al. | |
| 2014/0215147 A1 * | 7/2014 | Pan | G06F 11/1092 711/114 |

(Continued)

OTHER PUBLICATIONS

Dalmatov, Nickolay, et al.; "Redistributing Data Across Drives of a Storage Array Based on Drive Health Metrics," U.S. Appl. No. 16/176,897, filed Oct. 31, 2018.

(Continued)

*Primary Examiner* — Matthew M Kim
*Assistant Examiner* — Kyle Emanuele
(74) *Attorney, Agent, or Firm* — BainwoodHuang

(57) ABSTRACT

A method of responding to failures in a tiered storage system is provided. The method includes (a) rebuilding a set of failed storage extents belonging to a first storage tier; (b) receiving a notification that a particular storage extent has failed while rebuilding the set of failed storage extents belonging to the first tier; and (c) upon determining that the particular storage extent belongs to a second storage tier that has a higher priority than does the first storage tier: (1) pausing rebuilding the set of failed storage extents belonging to the first storage tier, (2) rebuilding the particular storage extent, and (3) resuming rebuilding the set of failed storage extents belonging to the first storage tier after rebuilding the particular storage extent. An apparatus, system, and computer program product for performing a similar method are also provided.

11 Claims, 4 Drawing Sheets

(56) References Cited

U.S. PATENT DOCUMENTS

2019/0332502 A1* 10/2019 Ma ..................... G06F 11/1076

OTHER PUBLICATIONS

Foley, Robert, et al.; "Selective Raid Repair Based on Content Mapping," U.S. Appl. No. 15/281,951, filed Sep. 30, 2016.
Gao, Jian, et al.; "Splitting a Group of Physical Data Storage Drives Into Partnership Groups to Limit the Risk of Data Loss During Drive Rebuilds in a Mapped Raid (Redundant Array of Independent Disks) Data Storage System," U.S. Appl. No. 15/497,984, filed Apr. 26, 2017.

* cited by examiner

PRIORITIZED REBUILDING OF EXTENTS IN MULTIPLE TIERS

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices.

Many conventional data storage appliances use RAID (redundant array of independent disks) arrangements to store large volumes of data across numerous physical storage drives. As is known, RAID systems typically store data redundantly so that data loss can be avoided even if one (or sometimes more) of the storage drives fail unexpectedly.

Some data storage appliances provide extra storage drives, which are reserved as "hot spares" in case one or more storage drives in a RAID system fail. In the event of a drive failure, the contents of the failed drive can be "rebuilt" onto a spare drive, e.g., by reconstructing data from the failed drive using data from the remaining drives. Once all the recovered data has been written to the spare drive, the RAID array can resume operation at its designed level of redundancy.

SUMMARY

Some data storage appliances are configured to arrange storage resources in multiple tiers, where different tiers have different levels of priority. Upon failure of a drive, the extents of that drive may be rebuilt in order of the priority of their respective tiers. Although a failure in one drive of a RAID array may not inhibit operation, it does reduce redundancy in the sense that a second failure could result in permanent data loss. Once an extent is rebuilt, a normal level of redundancy is restored. Since higher-priority data is generally placed on higher-priority tiers, rebuilding the higher-priority tiers before rebuilding the lower-priority tiers more fully protects the more important data from loss. Unfortunately, conventional data storage appliances may experience limitations if a second drive fails while a first failed drive is still being rebuilt. In that event, a conventional system may continue rebuilding the extents of the first failed drive in order of priority even though higher priority extents have failed on the second drive, which are not rebuilt until all extents of the first drive have been rebuilt. The conventional system thus has the potential of exposing critical data to a greater risk of loss than is strictly necessary Thus, it would be desirable to implement a data storage apparatus that uses techniques for rebuilding failed extents in order of priority of their respective tiers, even if the failed extents are derived from different drives that fail at different times. This may be accomplished by checking if any extents of a higher-priority tier have failed since beginning repairs of extents of a current tier, and, if so, switching to rebuild extents of the higher-priority tier before resuming rebuilding activities on other extents of the current tier.

In one embodiment, a method of responding to failures in a tiered storage system is provided. The method includes (a) rebuilding a set of failed storage extents belonging to a first storage tier; (b) receiving a notification that a particular storage extent has failed while rebuilding the set of failed storage extents belonging to the first tier; and (c) upon determining that the particular storage extent belongs to a second storage tier that has a higher priority than does the first storage tier: (1) pausing rebuilding the set of failed storage extents belonging to the first storage tier, (2) rebuilding the particular storage extent, and (3) resuming rebuilding the set of failed storage extents belonging to the first storage tier after rebuilding the particular storage extent. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments are directed to techniques for rebuilding failed extents in order of priority of their respective tiers, even if the failed extents are derived from different drives that fail at different times. This may be accomplished by checking if any extents of a higher-priority tier have failed since beginning repairs of extents of a current tier, and, if so, switching to rebuild extents of the higher-priority tier before resuming rebuilding activities on other extents of the current tier.

Figure 1:
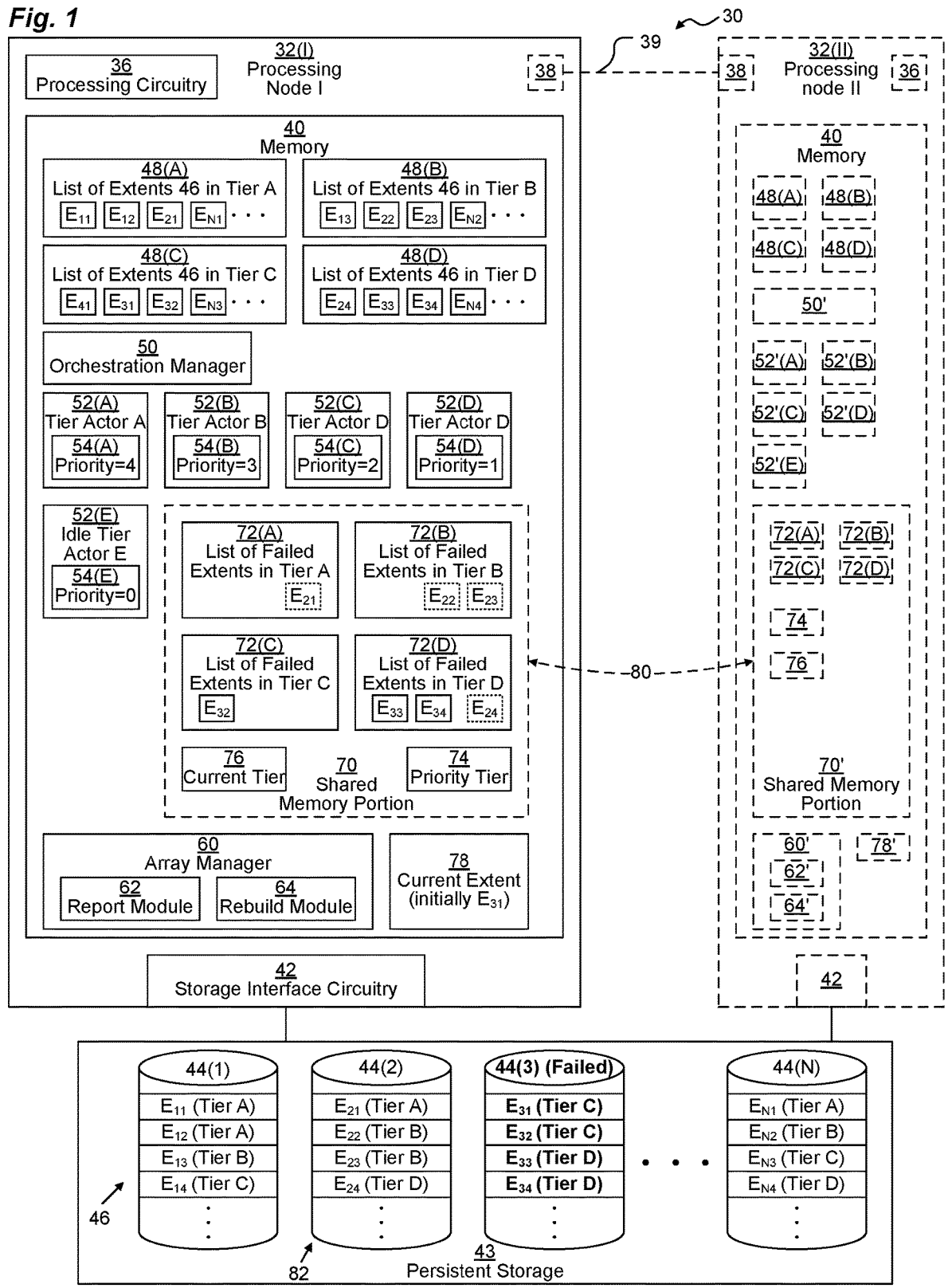
FIG. 1 is a block diagram depicting an example system and apparatus for use in connection with various embodiments.

FIG. 1 depicts an example data storage environment (DSE) 30. DSE 30 may be any kind of computing device or collection (or cluster) of computing devices, such as, for example, a personal computer, workstation, server computer, enterprise server, data storage array device, laptop computer, tablet computer, smart phone, mobile computer, etc.

DSE 30 includes at least one storage processing node 32(I) and persistent storage 43. In some embodiments, persistent storage 43 is shared between multiple processing nodes 32 (depicted as processing nodes 32(I), 32(11)). In some embodiments, processing nodes 32 may be implemented as circuit board assemblies or blades housed in a combined housing that also includes the persistent storage 43.

Processing node 32(I) includes processing circuitry 36, memory 40, and storage interface circuitry 42. Processing node 32 may also include other components as are well-known in the art, such as, for example, inter-processor connection bus circuitry 38, network interface circuitry (not depicted), and interconnection circuitry (not depicted).

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Inter-processor connection bus circuitry 38 connects to an inter-processor bus 39 that allows for high speed communication between processing nodes 32.

Network interface circuitry may include one or more Ethernet cards, cellular modems, Fibre Channel (FC) adapters, Wireless Fidelity (Wi-Fi) wireless networking adapters, and/or other devices for connecting to a network (not depicted). Network interface circuitry allows the processing node 32(I) to communicate with one or more host devices (not depicted) capable of sending data storage commands to the DSE 30 over the network. In some embodiments, a host application may run directly on the processing node 32(I).

Persistent storage 43 may include any kind of persistent storage devices 44, such as, for example, hard disk drives, solid-state storage devices (SSDs), flash drives, etc. Storage interface circuitry 42 controls and provides access to persistent storage 43. Storage interface circuitry 42 may include, for example, SCSI, SAS, ATA, SATA, FC, M.2, and/or other similar controllers and ports.

Persistent storage 43 is made up of a plurality of drives 44(1), 44(2), 44(3), . . . , 44(N) arranged in one or more arrays (e.g., RAID or Mapped RAID arrays). Stripes (not depicted) may span several drives 44, with one extent 46 (also known as a "strip") on each of several of the drives 44. Each stripe includes parity information that allows for a failed extent to be recovered with reference to the data of the other extents of the stripe. For example, in a RAID-5 configuration, each stripe includes one parity extent and several data extents. Any failed extent can be rebuilt by XORing together the data in the corresponding position of all of the other extents, as is well-known in the art. RAID-6 is similar, but even two failed drives can be repaired, and more complex Reed-Solomon encoding may be used rather than simple XOR-based parity. It should be understood that, in some embodiments using Mapped RAID configurations, for example, the distribution of extents 46 for different stripes can vary; for example, one stripe may be distributed across drives 44(1), 44(2), and 44(3), while another stripe may be distributed across drives 44(1), 44(3), and 44(N).

Each stripe is assigned to a particular tier from a plurality of available tiers (depicted as tiers A, B, C, and D). Each extent 46 that is assigned to a particular stripe has the same tier as its stripe. As depicted in FIG. 1, drive 44(1) includes at least three tiers E11, E12, E13, E14. Extents E11, E12, are assigned to tier A, extent E13 is assigned to tier B, and extent E14 is assigned to tier C. Various extents 46 are also depicted on drives 44(2), 44(3), and 44(N), each with its tier assignment shown in FIG. 1. As depicted, drive 44(3) has recently failed. Also as depicted, another failure event 82 later occurs so that drive 44(2) fails at some point after the extents of drive 44(3) begin to be rebuilt.

Memory 40 may be any kind of digital system memory, such as, for example, random access memory (RAM). Memory 40 stores one or more operating systems (OSes, not depicted) in operation (e.g., Linux, UNIX, Windows, MacOS, or a similar operating system), various applications executing on processing circuitry 36, and application data. For example, memory 40 stores orchestration manager 50, array manager 60, and a set of tier actors 52, each of which is configured to manage rebuilds for a particular tier with a particular priority 54. Thus, tier actor 52(A) is configured to manage rebuilding of extents 46 of tier A, which has a priority level 54(A) of 4. Tier actor 52(B) is configured to manage rebuilding of extents 46 of tier B, which has a priority level 54(B) of 3 (lower than 54(A)). Tier actor 52(C) is configured to manage rebuilding of extents 46 of tier C, which has a priority level 54(C) of 2. Tier actor 52(D) is configured to manage rebuilding of extents 46 of tier D, which has a priority level 54(D) of 1. In addition, idle tier actor 52(E) is configured to manage an idle state with idle priority 54(E) of zero.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 43 is configured to store programs and data even while a processing node 32 is powered off. The OS and the applications 50, 52, 60 are typically stored in this persistent storage portion of memory 40 or on persistent storage 43 so that they may be loaded into a system portion of memory 40 from this persistent storage portion of memory 40 or persistent storage 43 upon a system restart. These applications 50, 52, 60, when stored in non-transitory form either in the volatile portion of memory 40 or on persistent storage 43 or in persistent portion of memory 40, form a computer program product. The processing circuitry 36 running one or more of these applications 50, 52, 60 thus forms a specialized circuit constructed and arranged to carry out the various processes described herein.

Orchestration manager 50 is configured to maintain lists 48 (depicted as lists 48(A), 48(B), 48(C), 48(D)) of extents 46 in respective tiers A, B, C, D. Thus, as depicted, extents $E_{11}$, $E_{12}$, $E_{21}$, and $E_{N1}$ are listed in list 48(A) as belonging to tier A, extents $E_{13}$, $E_{22}$, $E_{23}$, and $E_{N2}$ are listed in list 48(B) as belonging to tier B, extents $E_{41}$, $E_{31}$, $E_{32}$, and $E_{N3}$ are listed in list 48(C) as belonging to tier C, and extents $E_{24}$, $E_{33}$, $E_{34}$, and $E_{N4}$ are listed in list 48(D as belonging to tier D.

Array manager 60 includes a report module 62 and a rebuild module 64. Report module 62 is configured to report any failure event (e.g., failure event 82) of a drive 44 to orchestration manager 50. In some embodiments, report module 62 is configured to send a failure report to orchestration manager 50 periodically, if necessary. For example, in one embodiment, report module 62 only sends a failure report every 10 seconds (or less frequently if there hasn't been any failure event to report).

In response to receiving a report from report manager 62, orchestration manager 50 is configured to update failed lists 72 (depicted as failed lists 72(A), 72(B), 72(C), 72(D)) of failed extents in respective tiers A, B, C, D. Thus, for example, as depicted, drive 44(3) previously failed, but extent $E_{31}$ has already been repaired. Thus, failed list 72(A) is initially empty because drive 44(3), as depicted, contains no extents 46 belonging to tier A. Similarly, failed list 72(B) is also initially empty. Failed list 72(C) initially lists extent $E_{32}$ because extent $E_{32}$ is part of drive 44(3) and belongs to tier C (but, as already mentioned, extent $E_{31}$ has already been rebuilt, so it is not listed). Failed list 72(D) initially lists extents $E_{33}$ and $E_{34}$ because both are in drive 44(3) and belong to tier D, but neither has been rebuilt yet. In response to receiving a report from report module 62 indicating that drive 44(2) has just failed after failure event 82, orchestration manager 50 adds the extents 46 of drive 44(2) to the appropriate failed lists 72. Thus, extent $E_{21}$ is added to failed list 72(A), $E_{22}$ and $E_{23}$ are added to failed list 72(B), and $E_{24}$ is added to failed list 72(D).

Upon updating the failed lists 72 in response to a report from report module 62, orchestration manager 50 also updates a value of the priority tier 74, which indicates the highest priority tier whose respective failed list 72 contains any entries. Since failed list 72(A) contains an entry for tier $E_{21}$ and since tier A has the highest priority of any tier (with priority value 4), orchestration manager 50 sets the priority tier 74 value to a value of 4, indicating tier A (instead of its previous value of 2, indicating tier C).

Tier actors 52 go through the failed lists 72, initiating rebuilds of the listed extents that have failed. Thus, prior to failure event 82, tier actor 72(C) has just managed the rebuilding of extent E31 and is about to move on to extent E32 as the next extent 46 in tier C listed in failed list 72(C). However, before moving on to the next failed extent in failed list 72(C), tier actor 52(C) first compares the priority tier 74 value to its own priority value 54(C). Since the priority tier 74 value of 4 is greater than priority value 54(C) of 2, tier actor 52(C) pauses operation, allowing orchestration manager 50 to initiate tier actor 52(A) to begin rebuilding the failed extents 46 of tier A.

Then tier actor 52(A) proceeds through the extents 46 listed in failed list 72(A). It first finds extent $E_{21}$ and begins rebuilding it. In some embodiments, tier actor 52(A) accomplishes this by sending a signal to rebuild module 64 if array manager 60 directing it to rebuild extent $E_{21}$. Tier actor 52(A) may also remove extent $E_{21}$ from failed list 72(A), listing it as the current extent 78. Then rebuild module 64 performs standard rebuild operations on extent $E_{21}$, returning a completion signal to tier actor 52(A) upon completion. Since there are no more extents 46 in failed list 72(A), tier actor 52(A) returns control to orchestration manager 50, which reevaluates the priority tier 74 value by finding the highest-priority tier with any extents 46 listed in its respective failed list 72, sending control to the tier actor 52 for that tier. Thus, since failed list 72(B) now has two extents $E_{22}$, $E_{23}$ listed therein, orchestration manager initiates tier actor 52(B). That allows the failed extents to be processed in the proper order.

In some embodiments, if there are multiple processing nodes 32 in DSE 30, failed lists 72 are stored in a shared memory portion 70 that is shared between the various processing nodes 32. In some embodiments, as depicted, shared memory portion 70 is kept mirrored with shared memory portion 70' of processing node 32(I) 32(11) by a synchronization process 80 over inter-processor bus 39. In other embodiments, shared memory portion 70 may reside outside of both processing nodes 32(I), 32(11), each processing node 32(I), 32(11) having equal access thereto. Shared memory portion 70 also includes the priority tier 74 value as well as a current tier value 76, so that the active tier actor 52 on each processing node 32 can be kept synchronized.

Figure 2:
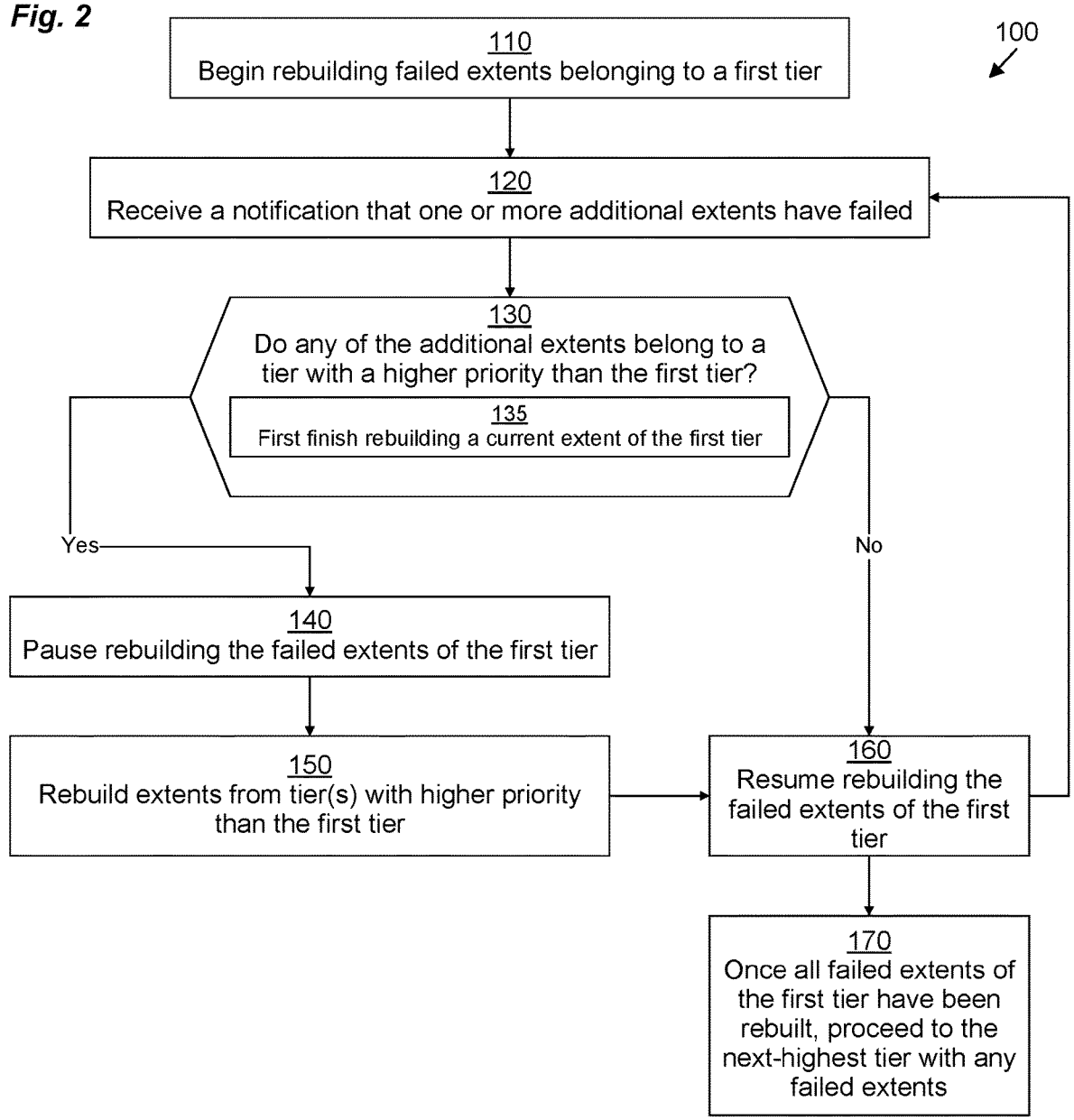
FIG. 2 is a flowchart depicting example methods of various embodiments.

FIG. 2 illustrates an example method 100 performed by DSE 30 for responding to failures of drives 44 with tiered extents 46. It should be understood that any time a piece of software (e.g., orchestration manager 50, tier actors 52, array manager 60, etc.) is described as performing a method, process, step, or function, in actuality what is meant is that a computing device (e.g., processing node 32(I)) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Method 100 is performed by DSE 30. More specifically, method 100 is performed by orchestration manager 50, tier actors 52, and array manager 60 running on processing node 32(I). In some embodiments, method 100 is also performed in coordination with another processing node 32 (e.g., 32(II)) which may run its own corresponding versions 50', 52', 60', 62, 64' of various components running on processing node 32(I). Processing node 32(11) may also maintain some data that differs from the corresponding data of processing node 32(I) (e.g., current extent 78' differs from current extent 78 because each processing node 32(I), 32(11) is currently processing a different extent 46).

In step 110, a processing node 32 begins rebuilding failed extents 46 belonging to a first tier. For example, a tier actor 52(x) running on the processing node 32 begins going through the extents 46 listed in its respective failed list 72(x), sending rebuild commands to rebuild module 64, and, upon receiving confirmation of rebuild of that extent 46, moving on to the next extent 46 listed in that failed list 72(x).

In step 120, notification is received that one or more extents 46 have newly failed. For example, orchestration manager 50 receives a notification from report module 62 of array manager 60 indicating that a drive 44, containing at least one extent 46, has just failed.

In step 130, processing node 32 evaluates whether or not any of the newly-failed extents 46 belongs to a tier 54 with a higher priority than that of the extents that are currently being rebuilt. For example, orchestration manager 50 sets the priority tier 74 value based on the highest priority tier with any extents 46 in its respective failed list 72 Then, tier 52(x), which is currently in the middle of processing its respective failed list 72(x), evaluates whether the priority tier 74 value exceeds its own priority value 54(x). In some embodiments, in sub-step 135, tier 52(x) performs this evaluation upon completing the rebuild process for the current extent 78.

If step 130 evaluates in the negative, then operation proceeds to step 160, in which the processing node 32 continues rebuilding the failed extents 46 of the current tier. Thus, tier actor 52(x) resumes rebuilding the extents 46 listed on its failed list 72(x). This continues until being interrupted by a new notification (returning to step 120) or all of the extents 46 on its failed list 72(x) being exhausted, in which case operation proceeds to the tier actor 52 having the next highest priority 54 value (e.g., tier actor 52(x-1), 52(x-2), etc.) (step 170).

If step 130 evaluates in the affirmative, then, in step 140, rebuilding the current tier is paused. Thus, for example, tier actor 52(x) may refrain from moving on to the next extent 46 on its failed list 72(x), instead returning operation to the orchestration manager 50. Then, in step 150, the processing node 32 begins rebuilding extents from another tier with a higher priority 54 than before. Thus, for example, orchestration manager 50 passes control to the tier actor 52(y) with the highest priority 54(y), where y>x. Eventually, once that tier actor 52(y) completes rebuilding the extents 46 listed in its respective failed list 72(y) (and any intervening tier actors 52(z) with x<z<y also complete building the extents 46 in their respective failed lists 72(z)), operation proceeds with step 160, allowing rebuilding of the original tier to continue.

Figure 3:
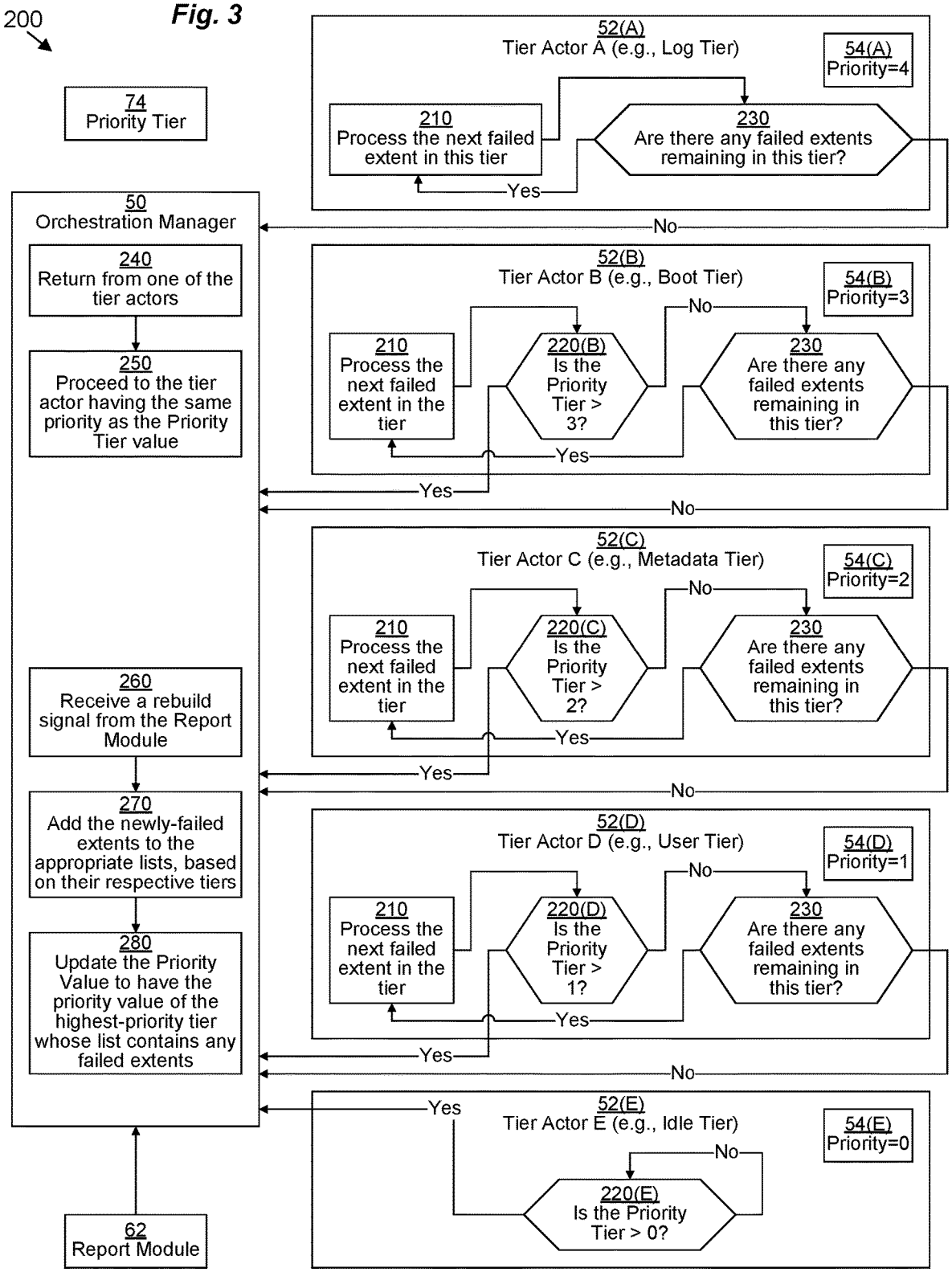
FIG. 3 is a diagram depicting various software modules of various embodiments.

FIG. 3 depicts an arrangement 200 of modules according to one example embodiment. As depicted in FIG. 3, there are four tiers plus an idle tier. It should be understood that this is by way of example only; there may be more tiers or fewer tiers. The highest-priority tier is tier A, which is a log tier in this example. The log tier is a tier of storage used for logging writes to a storage system which have not yet been fully ingested into the system. Rebuilding of failed extents of tier A is controlled by tier actor 52(A), which has priority 54(A)=4.

The next-highest priority tier is tier B, which is a boot tier in this example. The boot tier is a tier of storage used for storing parts of an operating system kernel that must be loaded for the processing node 32 to start up in a proper configuration if it needs to be restarted. Rebuilding of failed extents of tier B is controlled by tier actor 52(B), which has priority 54(B)=3

The next-highest priority tier is tier C, which is a metadata tier in this example. The metadata tier is a tier of storage used for storing metadata (e.g., inodes, block pointers, filesystem configuration information, address mapping information, etc.). Rebuilding of failed extents of tier C is controlled by tier actor 52(C), which has priority 54(C)=2.

The lowest-priority tier is tier D, which is a user tier in this example. The user tier is a tier of storage used for storing user data that has already been fully ingested into the system. Rebuilding of failed extents of tier D is controlled by tier actor 52(D), which has priority 54(D)=1.

Idle tier actor 52(E) has an even lower priority 54(E)=0. Each tier actor 52 aside from the idle tier 52(E) is configured to execute steps 210 and 230. In addition, each tier 52 aside from the highest tier 52(A) is configured to execute step 220.

In tier actor 52(A), step 210 executes to process the first extent 46 in failed list 72(A). Further detail with respect to step 210 is provided below in connection with FIG. 4. After step 210 is done, operation proceeds to step 230, which checks whether there are any extents 46 remaining listed in failed list 72(A). If not, tier actor 52(A) returns control to orchestration manager 50. If there are remaining extents 46 listed in failed list 72(A), then operation loops back top step 210 for the next extent 46 listed in 72(A). Because tier A has priority 54(A) that is higher than any other priority, there is no need to check the value of priority tier 74.

In tier actors 52(B), 52(C), 52(D) (collectively referred to as 52(x)), step 210 executes to process the first extent 46 in failed list 72(x). After that is done, operation proceeds to step 220 (step 220(B) for tier actor 52(B) using priority value 54(B), step 220(C) for tier actor 52(C) using priority value 54(C), and step 220(D) for tier actor 52(D) using priority value 54(D)), in which the priority value 54(x) of the current tier is compared to the value of the priority tier 74. If the priority tier 74 value is higher, then tier actor 52(A) returns control to orchestration manager 50. Otherwise, operation proceeds with step 230, which checks whether there are any extents 46 remaining listed in failed list 72(x). If not, tier actor 52(x) returns control to orchestration manager 50. If there are remaining extents 46 listed in failed list 72(A), then operation loops back top step 210 for the next extent 46 listed in 72(x).

In idle tier actor 52(E), step 220(E) executes in a loop. In step 220(E), the priority value 54(E)=0 of the current tier is compared to the value of the priority tier 74. If the priority tier 74 value is higher, then tier actor 52(A) returns control to orchestration manager 50. Otherwise, operation remains within tier actor 52(E) and step 220(E) may repeat.

Orchestration manager 50 is configured with several control paths. One control path is steps 240-250, and the other control path is steps 260-280.

In step 240, orchestration manager 50 receives a return signal from one of the tier actors 52 (in response to step 220 or 230 of that tier actor 52). The, in step 250, orchestration manager 50 activates the tier actor whose priority value 54 equals the current value of the priority value 74. In some embodiments, prior to step 250, orchestration manager 50 may reevaluate the priority value (see, e.g., step 280 below) by checking which is the highest-priority failed list 72 with any entries 46 listed therein.

In step 260, orchestration manager 50 receives a signal from the report module 62 indicating that a drive 44 has recently failed. Then, in step 270, orchestration manager 50 adds the extents 46 of that drive 44 to the appropriate failed list 72 based on which tier each such extent belongs to. This may be done with reference to lists 48. Thus, for example, when report module 62 reports failure event 82 of drive 44(2), orchestration manager 50 evaluates each extent $E_{21}$, $E_{22}$, $E_{23}$, and $E_{24}$ of drive 44(2) to determine which list 48 it is on and places it on corresponding failed list 72. Since extent $E_{21}$ is on list 48(A), it is added to failed list 72(A). Since extents $E_{22}$ and $E_{23}$ are on list 48(B), they are added to failed list 72(B). Since extent $E_{24}$ is on list 48(D), it is added to failed list 72(D).

Then, in step 280, orchestration module 50 updates the value of priority tier 74 to have the priority value 54 of the highest-priority tier whose respective failed list 72 lists any failed extents 46. Thus, for example, orchestration manager 50 may iterate through the failed lists 72 in order of priority (e.g., starting with failed list 72(A), then proceeding with failed list 72(B) then 72(C), and finally failed list 72(D), as needed), stopping at the first failed list 72(y) that it finds containing at least one entry of a failed extent 46. Orchestration manager 50 is then able to set the priority tier 74 to the same value as the priority value 54(y) of the tier corresponding to that failed list 72(y). This ensures that the next time any tier actor 52 aside from the highest-priority tier actor 52(A) finishes processing any failed extent (step 210), operation may proceed to rebuilding extents 46 of the highest-priority tier that are known to the orchestration manager 50 to have any failed extent(s) 46 due to operation of steps 220 and 250.

Figure 4:
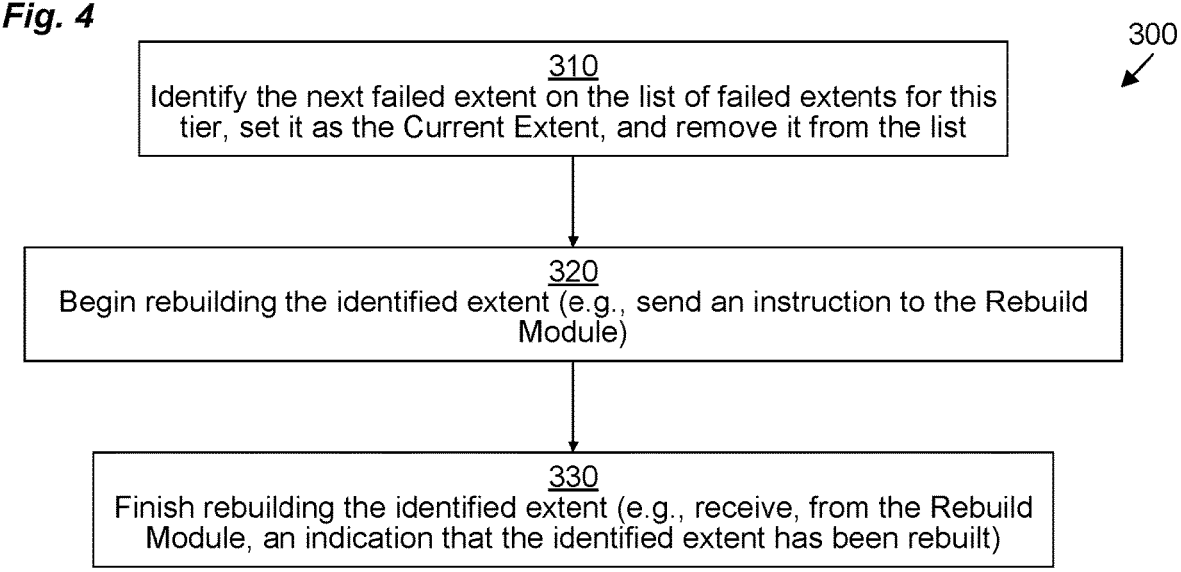
FIG. 4 is a flowchart depicting example methods of various embodiments.

FIG. 4 depicts an example implementation 300 of step 210 performed by a tier actor 52(A), 52(B), 52(C), or 52(D) (generically referred to as 52(x)). In step 310, tier actor 52(x) identifies the next failed extent 46 listed on failed list 72(x) of failed extents for the current tier, sets that next failed extent 46 as the current extent 78, and removes it from the failed list 72(x) (so that corresponding tier actor 52'(x) operating on processing node 32(11) knows to skip over that extent 46). Then, in step 320, tier actor 52(x) initiates rebuilding of the current extent 78. In some embodiments, step 320 is accomplished by sending an instruction to rebuild module 64 instructing it to rebuild the current extent 78. Then, in step 330, tier actor 52(x) finishes rebuilding the current extent 78 and method 300 terminates returning control to the next step (e.g., step 220 or 230) of the tier actor 52(x) that initiated it in implementation of step 210. In some embodiments, step 330 is accomplished by receiving an indication from rebuild module 64 that the current extent 78 has been completely rebuilt.

Thus, techniques have been presented for rebuilding failed extents 46 in order of priority 54 of their respective tiers, even if the failed extents 46 are derived from different drives 44 that fail at different times (e.g., drive 44(3) failing before drive 44(2)). This may be accomplished by checking if any extents 46 of a higher-priority tier have failed since beginning repairs of the current tier, and, if so, switching to rebuild extents 46 of the higher-priority tier before resuming rebuilding activities on the other extents 46 of the current tier.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of responding to failures in a tiered storage system, the method comprising:
rebuilding a set of failed storage extents belonging to a first storage tier;
receiving a notification that a particular storage extent has failed while rebuilding the set of failed storage extents belonging to the first storage tier; and
upon determining that the particular storage extent belongs to a second storage tier that has a higher priority than does the first storage tier:
pausing rebuilding the set of failed storage extents belonging to the first storage tier;
rebuilding the particular storage extent; and
resuming rebuilding the set of failed storage extents belonging to the first storage tier after rebuilding the particular storage extent,
wherein pausing rebuilding the set of failed storage extents includes finishing rebuilding a current storage extent of the set of faded storage extents that is currently being rebuilt; and
wherein determining that the articular store e extent belongs to the second storage tier is performed upon finishing rebuilding the current storage extent.

2. The method of claim 1,
wherein receiving the notification includes receiving notice that a plurality of storage extents have failed, the plurality of storage extents including the particular storage extent; and
wherein the method further comprises, in response to determining that multiple extents of the plurality of storage extents belong to the second storage tier, rebuilding each of the multiple extents prior to resuming rebuilding the set of failed storage extents belonging to the first storage tier.

3. The method of claim 2 wherein the method further comprises, in response to determining that another storage extent of the plurality of storage extents belongs to a third storage tier that has a higher priority than does the second storage tier, rebuilding the other storage extent prior to rebuilding the particular storage extent and the multiple extents.

4. The method of claim 2 wherein the method further comprises, in response to determining that another storage extent of the plurality of storage extents belongs to a third storage tier that has a priority lower than does the second storage tier and higher than does the first storage tier, rebuilding the other storage extent after rebuilding the particular storage extent and the multiple extents but prior to resuming rebuilding the set of failed storage extents belonging to the first storage tier.

5. The method of claim 1 wherein the method further comprises:
receiving a notification that another storage extent has failed while rebuilding the set of failed storage extents belonging to the first storage tier; and
upon determining that the other storage extent belongs to a third storage tier that has a lower priority than the first storage tier, completing rebuilding the set of failed storage extents belonging to the first storage tier prior to rebuilding the other storage extent.

6. The method of claim 1,
wherein the method further comprises, in response to determining that the particular storage extent belongs to the second storage tier, setting a highest priority value in memory that indicates a highest priority level for any storage extent that is currently in a failed state; and
wherein determining that the particular storage extent belongs to the second storage tier includes, upon finishing rebuilding the current storage extent, comparing the highest priority value in memory to a priority value of the first storage tier and determining that the highest priority value in memory is higher.

7. The method of claim 6,
wherein two processing devices of the storage system operate to rebuild failed storage extents of the storage system; and
wherein setting the highest priority value in memory includes storing the highest priority value in a portion of memory that is shared between the two processing devices.

8. The method of claim 1, wherein each of the failed storage extents includes a respective strip of a RAID (Redundant Array of Independent Disks) stripe stored on a storage drive.

9. The method of claim 1, wherein the failed storage extents belong to respective RAID stripes in a mapped RAID configuration.

10. An apparatus comprising processing circuitry coupled to memory configured to respond to failures in a tiered storage system by:
rebuilding a set of failed storage extents belonging to a first storage tier;
receiving a notification that a particular storage extent has failed while rebuilding the set of failed storage extents belonging to the first storage tier; and
upon determining that the particular storage extent belongs to a second storage tier that has a higher priority than does the first storage tier:
pausing rebuilding the set of failed storage extents belonging to the first storage tier;
rebuilding the particular storage extent; and
resuming rebuilding the set of failed storage extents belonging to the first storage tier after rebuilding the particular storage extent,
wherein pausing rebuilding the set of failed store e extents includes finishing rebuilding a current storage extent of the set of faded storage extents that is currently being rebuilt; and
wherein determining that the particular storage extent belongs to the second storage tier is performed upon finishing rebuilding the current storage extent.

11. A computer program product comprising a non-transitory computer-readable storage medium storing a set of instructions, which, when executed by a computing device cause the computing device to respond to failures in a tiered storage system by:
rebuilding a set of failed storage extents belonging to a first storage tier;
receiving a notification that a particular storage extent has failed while rebuilding the set of failed storage extents belonging to the first storage tier; and
upon determining that the particular storage extent belongs to a second storage tier that has a higher priority than does the first storage tier:
pausing rebuilding the set of failed storage extents belonging to the first storage tier;
rebuilding the particular storage extent; and
resuming rebuilding the set of failed storage extents belonging to the first storage tier after rebuilding the particular storage extent,
wherein pausing rebuilding the set of faded storage extents includes finishing rebuilding a current storage extent of the set of failed storage extents that is currently being rebuilt; and
wherein determining that the particular storage extent belongs to the second storage tier is performed upon finishing rebuilding the current storage extent.

* * * * *